United States Patent [19]
Schultz

[11] Patent Number: 5,276,919
[45] Date of Patent: Jan. 4, 1994

[54] RADIO WITH REUSABLE BREAKAWAY SWITCH

[75] Inventor: Charles P. Schultz, Hialeah, Fla.

[73] Assignee: Motorola, Inc., Schaumburg, Ill.

[21] Appl. No.: 905,150

[22] Filed: Jun. 22, 1992

Related U.S. Application Data

[63] Continuation of Ser. No. 680,480, Apr. 4, 1991, abandoned.

[51] Int. Cl.$^5$ ............................................. H04B 1/04
[52] U.S. Cl. ........................................ 455/95; 455/128; 200/61.7
[58] Field of Search ................ 455/91, 93, 95, 100, 455/128, 90, 347, 351; 340/825.34, 825.54, 825.72, 652; 361/422; 200/61.7

[56] References Cited

U.S. PATENT DOCUMENTS

| | | | |
|---|---|---|---|
| 3,624,938 | 12/1971 | Richard | 340/825.34 |
| 3,806,936 | 4/1974 | Koster | 455/100 |
| 4,096,577 | 6/1978 | Ferber et al. | 364/705.02 X |
| 4,121,160 | 10/1978 | Cataldo | 455/128 |
| 4,194,157 | 3/1980 | Uno | 455/349 X |
| 4,237,540 | 12/1980 | Sato | 364/708 X |
| 4,673,936 | 6/1987 | Kotoh | 455/100 |
| 4,674,285 | 3/1986 | Bascou | 455/128 |
| 4,688,262 | 8/1987 | Schaefer et al. | 455/349 X |
| 4,754,418 | 6/1988 | Hara | 364/708 |
| 4,935,745 | 6/1990 | Mori et al. | 455/90 |
| 4,963,876 | 10/1990 | Sanders et al. | 455/90 |

FOREIGN PATENT DOCUMENTS 1-38823  5/1989  Japan .............................. 455/95

Primary Examiner—Reinhard J. Eisenzopf
Assistant Examiner—Andrew Faile
Attorney, Agent, or Firm—M. Mansour Ghomeshi

[57] ABSTRACT

An electronic device (100) includes a substantially planar housing (110). The housing (110) includes a portion (104) being selectively rotatable out of the plane of the housing (110). The electronic device (100) includes an electronic circuit (400) placed in the housing (110). The electronic device (100) further includes a switch (114, 116, and 118) coupled to the rotatable portion (104) of the housing (110).

7 Claims, 3 Drawing Sheets

RADIO WITH REUSABLE BREAKAWAY SWITCH

This is a continuation of application Ser. No. 07/680,480, filed Apr. 4, 1991 and now abandoned.

TECHNICAL FIELD

This invention relates generally to a communication device and more particularly to a portable communication device.

BACKGROUND

Miniaturization of electronic devices to approach the size of a credit card is known in the art. Some calculators are available that have the same width and height as a credit card and have a multiple of depth. Similar technologies have been employed in more complicated electronic devices such as radio communication devices to result in considerable size reduction as well. In some communication devices, planar housing have been employed with flapped and hinged covers. These covers are used as switches intended to turn the unit on when flapped open. In some telephone applications, the flapped cover contains a microphone used in voice transmissions. With these applications, a variety of switches are employed to accommodate remaining and desired other features. It is clear that with the size of communication devices reaching that of a credit card no room will be available for mountable switches. It is therefore clear that a need exists for a switch assembly suitable for use with miniaturized and credit card shaped devices having flat planes.

SUMMARY OF THE INVENTION

Briefly, according to the invention, an electronic device is disclosed having a substantially planar housing. The housing includes a portion being selectively rotatable out of the plane of the housing. The electronic device includes an electronic circuit placed in the housing. The electronic device further includes switch means coupled to the rotatable portion of the housing switching means for switching between two states.

DETAILED DESCRIPTION OF THE PREFERRED EMBODIMENT

Figure 1:
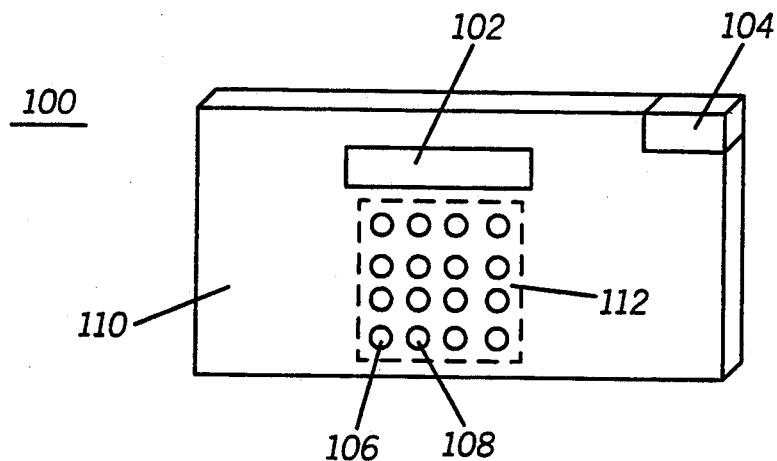
FIG. 1 is a perspective diagram of an electronic device having a rotatable portion in the closed position in accordance with the present invention.

Referring to FIG. 1, a perspective diagram of an electronic device 100 having a rotatable switch 104 is shown in accordance with the present invention. The switch 104 is shown to be in the closed position in this figure. The device 100 includes a credit card shape housing 110 having a planar surface. The device 100 further includes a display 102 and a plurality of keys 106, 108, and others shown but not referenced. The combination of keys 106, 108, and others not referenced are labeled as keyboard 112. As demonstrated in FIG. 1, the rotatable switch 104 is physically a portion of the housing 110. In the closed position, the switch 104 is flush with the planar surface of the housing 110. The rotatable switch 104 is a mechanical switch having a hinge or a pivot and providing contact between two points. The display 102 is used to display the information entered via the keyboard 112 or received over the air. The rotatable portion 104 may be a removable switch that occupies the same area when inserted. To activate, the removable switch is removed resulting in the removal of continuity between two contacts.

Figure 2A:
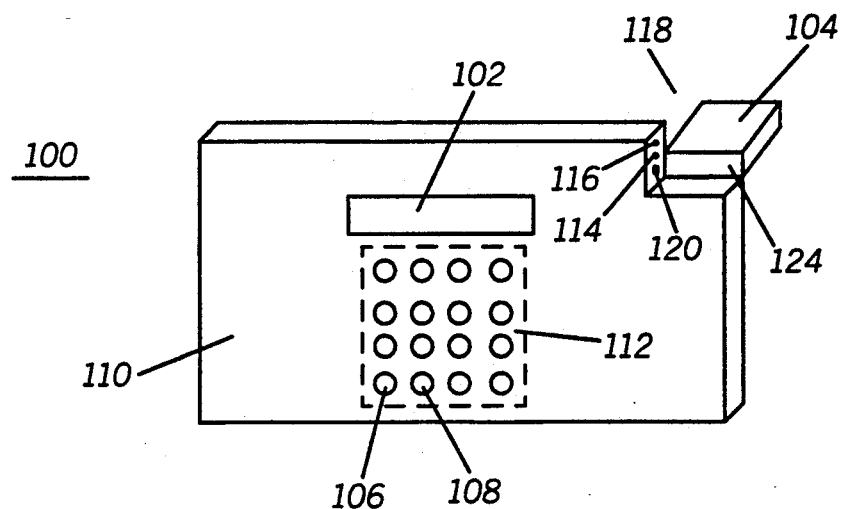
FIGS. 2A and 2B are perspective diagrams of an electronic device having a rotatable portion in the open position in accordance with the present invention.

Referring to FIG. 2A, the preferred embodiment of the present invention is shown. In this embodiment, the rotatable switch 104 is hinged on one side and in a sense is broken away when activated. This hinge provides the means for retaining the rotatable switch to the housing 110. The electronic device 100 is shown with the rotatable switch 104 in the open position extending away from the housing 110. Two contacts 114 and 116 are shown to be in the side of the housing 110 in the path of the switch 104. A wide contact 118 (not shown) is located on the rotatable portion 104. This contact 118 is located substantially in parallel with the contacts 114 and 116. With this arrangement and with the rotatable switch 104 in the closed position, the contact 118 mechanically couples contacts 114 and 116. The combination of the contacts 114, 116, and 118 forms a contact switch that is closed when the rotatable switch 104 is in the closed position. A retainer 120 on the housing 110 holds the rotatable switch 104 in place when it is in the closed position. The retainer 120 secures the complete return of the switch 104 to the closed position and minimizes accidental activation of the switch 104. The retainer 120 is shown to be a dimple having a receptacle in the side of the rotatable portion 104. The mating of this dimple 120 and its receptacle produces a spring force participating in minimizing accidental activation.

It is preferred that the electronic device 100 to be a communication device with the rotatable switch 104 as the emergency switch. In radio communication devices, it is desired to designate a mechanical switch to emergency. This is desired so as to provide the user with a mechanical indication that the requested emergency transmission was successfully initiated. With credit card size radios, there is no room for any mechanical switches, making the use of rotatable switch 104 ideal. The display 102 is used to display the received data messages or keyboard entries to a user. With this size communication devices, the antennas are generally internal to maintain the physical integrity of the plane surface.

Figure 2B:
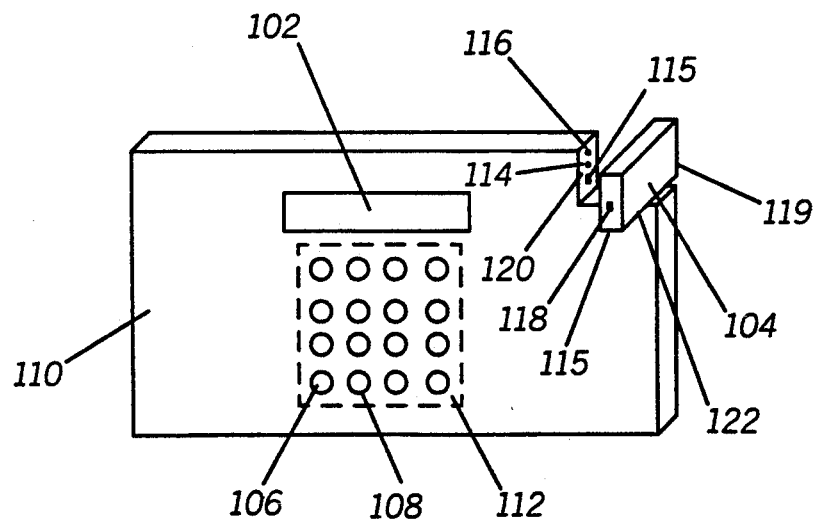

Referring now to FIG. 2B, an alternative embodiment of the present invention is shown in accordance with the present invention. The rotatable switch 104 includes the contact plate 118 and an additional contact plane 119. An additional contact 115 has been added to the housing 110. The axis of rotation of the rotatable switch 104 has been shifted from the side to the center. With this feature, the switch 104 can function as two mutually exclusive switches. Labels can be used on the two faces of the rotatable portion of the switch 104 to identify the particular contacts being coupled. These labels may be symbols or legends physically imprinted on the rotatable portion. The rotatable switch 104 may be either hinged or pivoted to meet the objective of this embodiment.

Figure 3A:
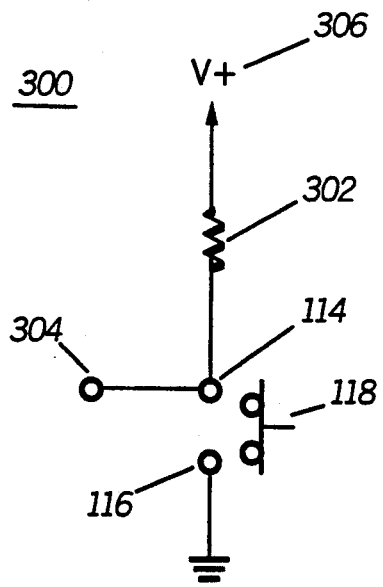
FIGS. 3A and 3B are circuit diagrams of a switch in accordance with the present invention.
Figure 3B:
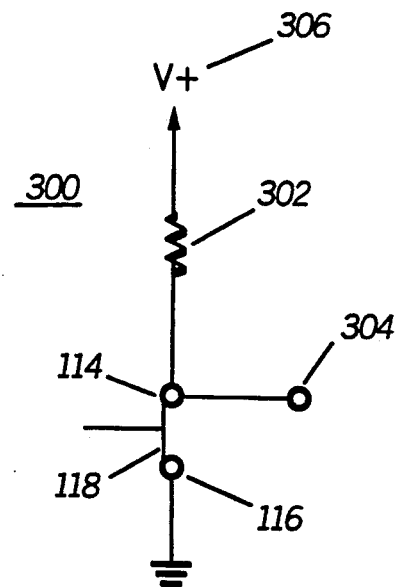

Referring to FIGS. 3A and 3B, a schematic diagram 300 of the electrical operation of the switch 104 is shown in accordance with the present invention. A resistor 302 couples a V+ line 306 to the contact point 114. The contact point 116 is coupled to ground. The contact plate 118 is shown as a contact bar that provides the electrical contact between contacts 114 and 116. A signal line 304 is used to electrically couple the activation of the switch 104 to an electronic circuit which operates in conjunction with the switch 104. The diagram of FIG. 3B shows the switch 104 when it is in the closed position as physically shown by FIG. 1. The contact plate 118 electrically connects the two contacts 114 and 116. With this connection, the voltage level at the signal line 304 is at the same potential as ground.

FIG. 3A shows the contact plate 118 in the open position as physically depicted by FIG. 2. With the plate 118 released, an open circuit is developed between the two contacts 114 and 116. Subsequently, the voltage at the signal line 304 is equal to the V+ line 306 voltage level minus the voltage drop across the resistor 302. Note that the resistor 302 may be placed in series with the ground contact to achieve similar results.

In summary, an electronic device having a credit card shaped housing is described. The housing has a planar surface and includes a rotatable portion that is used as a switch to controls a function of the electronic device. The rotatable portion is flat and in the planar plane of the housing of the electronic device.

Figure 4:
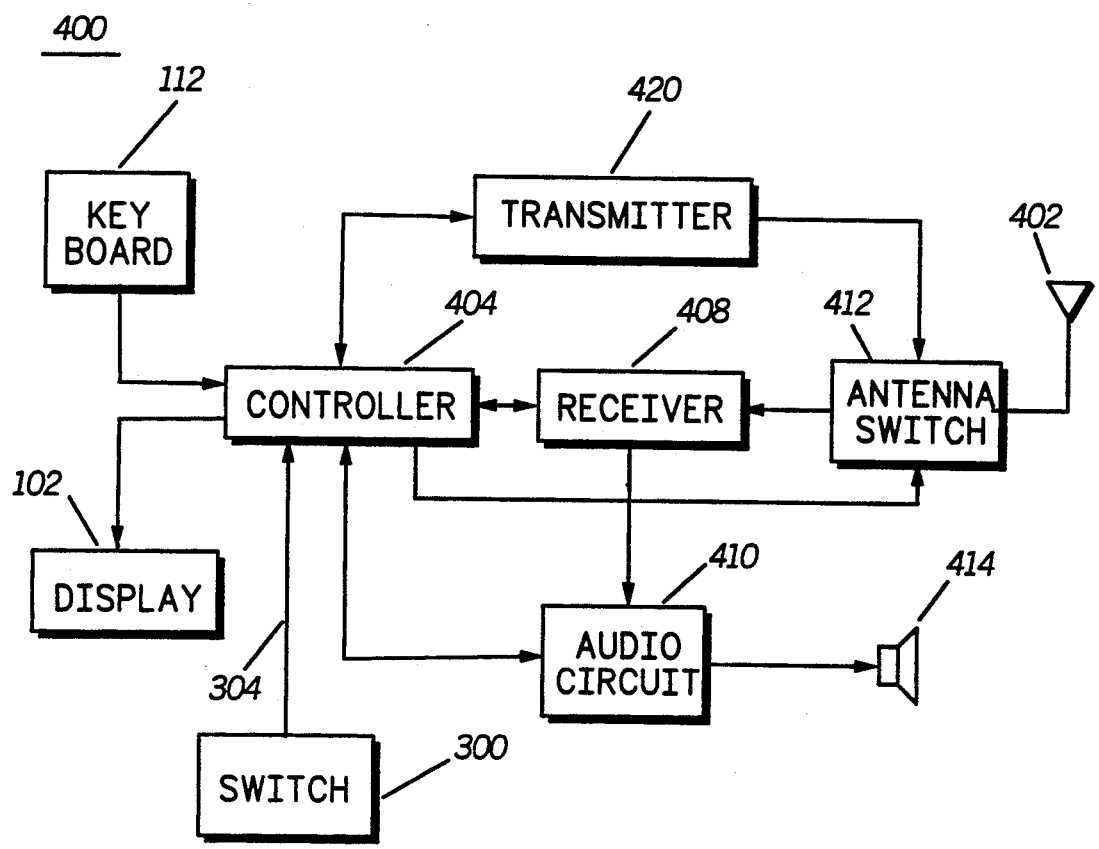
FIG. 4 is a block diagram of a communication device in accordance with the present invention.

Referring to FIG. 4 now, a block diagram of the electrical components of a communication device 400 is shown in accordance with the present invention. The communication device 400 is housed in the housing 110 and includes an internal antenna 402. The communication device 400 includes a receiver 408 and a transmitter 420, both coupled to the antenna 402 via an antenna switch 412. The antenna switch 412 couples the antenna 402 to the transmitter 420 or the receiver 408 under the direction of the controller 404. A radio frequency signal available at the antenna 402 is coupled to the input of the receiver 408 via the antenna switch 412. The received radio frequency signal is recovered by the receiver 408 and coupled to the controller for appropriate presentation. Data messages are decoded by the controller 404 and stored or displayed on the display 102. Voice messages are coupled to the speaker 414 via the audio circuit block 410. The audio circuit block 410 contains audio gating circuits which control the gating of audio to the speaker 414. The gating of the audio circuits is controlled by the controller 404. The switch circuit 300 is coupled to the controller 404 via the signal line 304. In the event of an emergency, the switch 104 is rotated removing the electrical and mechanical contact between the contacts 114 and 116. This removal of contact changes the voltage at the signal line 304 from ground level to V+ minus the voltage drop across the resistor 302. This change in voltage level is recovered by the controller 404 via the signal line 304. The controller 404 proceeds to take action on the request made by the actuation of the rotatable switch 104. In the event that the rotatable switch 104 is the emergency switch, the controller 404 sends an emergency signal to the transmitter 420. The transmitter 420 transmits this emergency signal via the antenna switch 412 and the antenna 402.

Size reduction in electronic devices has always been a major objective of designers. Recently great advances have been realized in reducing the size of electronic components making the workings of these electronic devices. With these advances, size reduction to the size of a credit card has been achieved in a number of electronic devices. In these devices, the use of soft keys does not hampered general operation. In certain applications however, soft keys can not be used due to the nature of the operation these switches initiate. Consequently, mechanical switches must be employed with the loss of physical harmony. With this invention, rotatable switches can be used to achieve desired operation and maintain the packaging integrity of the device. It is no longer necessary to sacrifice appearance to achieve performance in such electronic devices.

Those skilled in the art will recognize that various modifications and changes could be made with respect to the above described invention, without departing from the spirit and scope of the invention as set forth. Therefore, it should be understood that the claims are not to be considered as limited to the particular embodiments set forth in the absence of specific limitations expressly incorporating such embodiments.

What is claimed is:

1. A communication device, comprising:
   a substantially planar credit card shaped housing, the housing having a rotatable portion, which portion is an integral planar segment of the housing with the same width as the housing and is selectively rotatable out of the plane of the housing;
   a transmitter housed in the credit card shaped housing for transmitting radio frequency signals; and
   switching means mechanically coupled to the rotatable portion of the housing and electrically coupled to the transmitter for selectively activating the transmitter to transmit a signal and providing a visual indication of the transmission.

2. The communication device of claim 1, wherein the switching means includes a contact switch.

3. The communication device of claim 1, wherein the rotatable portion includes the switching means.

4. A communication device having an emergency state comprising:
   a credit card shaped housing having a rotatable portion rotating around a planar axis, the rotatable portion is an integral planar portion of the housing and has the same width as the housing;
   a switch coupled to the rotatable portion for visually activating the emergency state and providing a visual indication that the emergency state has been activated; and
   a transmitter response to the switch for transmitting an emergency signal corresponding to the emergency state.

5. The communication device of claim 4, wherein the housing further includes a display.

6. The communication device of claim 4, wherein the housing further includes a keyboard.

7. A communication device comprising:
   a transmitter for transmitting signals including an emergency signal;
   a credit card shaped enclosure for housing the transmitter, the enclosure having a planar rotatable portion, the planar portion having the same width as the enclosure; and
   a switch coupled to the planar rotatable portion and the transmitter so as to visually initiate the transmission of the emergency signal;
   whereby the transmitter automatically transmits the emergency signal upon rotation of the planar rotable portion.

* * * * *